United States Patent [19]

Schommartz et al.

[11] Patent Number: 5,092,450
[45] Date of Patent: Mar. 3, 1992

[54] METHOD AND APPARATUS FOR CONVEYING AND SYNCHRONIZING THE MOVEMENT OF ARTICLES

[75] Inventors: Eugen Schommartz, Rodgau; Holger Dietz, Solms; Ralf Görsdorf; Rudolf Hofmann, Kinzenbach; Martin Petry, Giessen, all of Fed. Rep. of Germany

[73] Assignee: Rovema Verpackungmaschinen GmbH, Fernwald, Fed. Rep. of Germany

[21] Appl. No.: 516,107

[22] Filed: Apr. 27, 1990

[30] Foreign Application Priority Data

Nov. 23, 1989 [DE] Fed. Rep. of Germany ....... 3938719

[51] Int. Cl.⁵ .............................................. B65G 47/26
[52] U.S. Cl. ..................... 198/460; 198/461; 198/464.2; 198/572; 198/579
[58] Field of Search ............... 198/460, 461, 572, 579, 198/464.2, 464.4

[56] References Cited

U.S. PATENT DOCUMENTS

| | | | |
|---|---|---|---|
| 3,075,630 | 1/1963 | Fisk | 198/460 X |
| 3,485,339 | 12/1969 | Miller et al. | 198/460 |
| 3,908,333 | 9/1975 | Cavanna | 198/461 X |
| 3,995,735 | 12/1976 | Risley | 198/460 X |
| 4,182,443 | 1/1980 | Pongracz | 198/461 X |
| 4,197,935 | 4/1980 | Aterianus et al. | 198/461 X |
| 4,360,098 | 11/1982 | Nordstrom | 198/460 X |
| 4,518,075 | 5/1985 | Aykut et al. | 198/461 X |
| 4,558,777 | 12/1985 | Francioni | 198/461 |
| 4,604,704 | 8/1986 | Eaves et al. | 198/460 X |
| 4,629,058 | 12/1986 | Reissmann et al. | 198/461 |
| 4,640,408 | 2/1987 | Eaves | 198/460 |

FOREIGN PATENT DOCUMENTS 3444625 6/1986 Fed. Rep. of Germany ... 198/464.2

*Primary Examiner*—D. Glenn Dayoan
*Attorney, Agent, or Firm*—Flynn, Thiel, Boutell & Tanis

[57] ABSTRACT

A method and an apparatus for conveying and synchronizing the movement of articles. Two conveyor belts are thereby provided. A synchronizing device is arranged between the conveyor belts. The phase relationship of the individual articles and the speed of a receiving belt can be adjusted with the help of the synchronizing device. To facilitate the adjusting of the position of the articles and to make such adjusting more precise, the invention provides that the first and the second conveyor belt are moved at a faster speed than the receiving belt.

17 Claims, 2 Drawing Sheets

METHOD AND APPARATUS FOR CONVEYING AND SYNCHRONIZING THE MOVEMENT OF ARTICLES

FIELD OF THE INVENTION

The invention relates to a method and an apparatus for conveying and synchronizing the movement of articles. In particular, the invention relates to a method in which the articles are guided from a first conveyor belt onto at least one synchronizing belt, from same onto a second conveyor belt and thereafter onto a receiving belt, with the first and the second conveyor belts being moved at the same speed. The apparatus of the invention includes a first conveyor belt and a second conveyor belt, in front of which is arranged a receiving belt, and a synchronizing device arranged between the first and the second conveyor belt, which synchronizing device includes at least one synchronizing belt such that the first and the second conveyor belt are driven with the same speed.

BACKGROUND OF THE INVENTION

De-OS 28 10 979 discloses a method and apparatus for synchronizing the time sequence of articles with the working cycle of a machine receiving the articles. This method or rather this apparatus is used for example in connection with packaging machines or others, in which it is necessary to feed the respective articles in proper phase relation to the receiving machine, for example in order to move the articles into packaging. Since varying distances between the individual articles, caused by the manufacture of the articles and the geometry of the conveying paths, can exist on the preceding conveying paths, it is necessary to align or rather synchronize the articles accordingly in order to prevent the articles from being incorrectly transferred to the receiving machine.

The known apparatus has all together three conveyor belts, between each of which synchronizing devices are provided. The three conveyor belts run each at the same, synchronous speed, while the synchronizing devices arranged in between are used to accelerate or slow down the respective articles so that the distances between them can be changed and the position of the respective article is adjusted to the phase of the following receiving machine. The basic principle here is that the following, receiving machine is operated at the same speed as the three conveyor belts so that a difference in speed can exist only in the area of the synchronizing belts. This has the disadvantage that the two constructed synchronizing devices, limited in their length, represent the only possibility to carry out an adjustment to the respective phase of the article. The phase difference to be thus bridged with the apparatus is therefore relatively small. A further disadvantage is that the slow-running conveyor belts, the speed of which is synchronous with the speed of the belt of the receiving machine, show only an unfavorable occupation with articles, so that all together, referred to the total length of the conveying device, only very few articles can be placed. This results in a very unfavorable dimensioning of the system since same must have a considerable length.

The basic purpose of the invention is to provide an apparatus and a method of the above-mentioned type, which with a simple design and simple use enables a synchronizing and conveying of articles such that the articles can be transferred in precise phase relation to receiving machine, thereby assuring a high efficiency and a precise movement of the articles.

SUMMARY OF THE INVENTION

The purpose is attained by the first and the second conveyor belt being moved at a higher speed than the receiving belt, namely, the receiving belt runs slower than the conveyor belts. This design of both the method and also the apparatus results in the particular advantage that the position of the individual articles can be exactly adjusted and exactly aligned because sufficient space is available between the individual articles on the conveyor belts, namely, a sufficient path of the individual articles is covered in order to carry out the respective adjustments and adaptations.

A favorable further development of the method provides that the synchronizing belt selectively accelerates or delays the articles so that the phase of the articles can be aligned in only one synchronization range. This results, in comparison to the known state of the art, in a significant advantage in that the synchronization operation can be designed substantially simpler since only one simple synchronization is sufficient for the proper phase adaptation.

A particularly favorable development of the invention provides that the first and the second conveyor belts run at least 1.3 times the speed of the receiving belt, preferably, however, at 1.6 times the speed. It can thereby be advantageous for the maximum speed of the conveyor belt to be up to 3 m per second. A very high conveying rate results from this, which conveying rate is favorable for the entire dimensioning of the system.

In order to detect the respective position of the conveyed article and in order to decide in which manner the article must be changed in its phase alignment, namely, whether the article must be accelerated or slowed down, the invention provides a sensor device in the area of the first conveyor belt, which sensor device can for example be designed in the form of a light barrier. The width of the article can be measured by means of the sensor device, namely, it can be determined how much time is needed to move the article at a pregiven conveying speed of the conveyor belt passed the sensor. The center of gravity of the article, which center of gravity usually corresponds with the geometric center of the article, can be determined in a simple manner from the width of the article. The synchronization can according to the invention occur with respect to the center of gravity of the article and does not depend, like this is the case in the state of the art, on a pure dimensioning of the article. The advantage of the association with the center of gravity is that the transfer of the article from one conveyor belt to another belt or vice versa is thus optimized. Thus, it is possible to control, in dependency of the phase deviation, the synchronizing belt or rather the synchronizing belts such that they have already reached the desired speed for the respective article when its center of gravity is passed over onto the synchronizing belts.

A particularly preferred development of the invention provides that the synchronizing belt has a length which corresponds just with the length times the speed factor of the first and second conveyor belts with respect to the receiving belt of the respective article. Since the synchronization is done with respect to the center of gravity, such a length of the synchronizing belt is sufficient and the entire system has thus significantly smaller dimensions.

It is furthermore advantageous according to the invention to provide a partitioned type belt as the receiving belt. The articles can then be transferred into the individual spaces on the belt. A transfer occurs thereby advantageously in the curved position of the partitioned type band, in which the boundary surfaces of the partitions, which surfaces lie on the outside, form a larger opening than at their bases. The article is thus moved onto the partitioned type belt and slides due to its own weight against the front boundary wall. The rear boundary wall of the partitioned type belt, which is again substantially erected during the level transport path of the partitioned type belt, thus does not need to move the article any further in the ideal case since same is already exactly positioned. However, it is possible to compensate for smaller position inexactnesses with the help of the partitioned type belt. The invention thus guarantees an exact positioning of the article in the respective space of the partitioned type belt and also guarantees an adapting possibility of the partitioned type belt to the respective articles since the spaces must not be larger than the length or rather width of the article.

The difference in speed between the conveyor belts and the partitioned type belt is preferably the factor 0.6, namely, the conveyor belts run at 1.6 times the speed of the partitioned type belt. This results on the one hand in a favorable separation of the individual articles, on the other hand the difference in speed is sufficient to obtain a dynamic in between storage of one article. This means that one article more per interval of time can be arranged on the supplying belt than can be transported away by the removing belt or the partitioned type belt.

The difference in speed between the receiving belt or the partitioned type belt and the conveyor belts thus is used to receive, to accelerate or increase the spacing, thus to separate, the articles supplied through a further, preceding conveying device. Thus the invention provides for an increase in the distance between the articles, which due to the preceding conveying device lie relatively close to one another. Thus, the possibility is created of adapting the respective position of the article exactly to the phase relationship of the receiving belt or partitioned type belt.

To prevent the respective space in the receiving belt or partitioned type belt from being already occupied, it is examined prior to inserting the article whether the space on the partitioned type belt is empty. Should this not be the case, the article can be delayed and can be placed into the next space. From this also results the advantage of the so-called dynamic storage, namely, one more article can be provided on the supplying belts than is removed by the partitioned type belt. The number of articles to be handled in the system of the invention is thus predetermined within the scope of a 1:1 occupancy, namely, it is possible to supply exactly as many articles as can be further processed by the receiving belt or partitioned type belt, with an additional article being able to be dynamically stored in between by the dynamic storage arrangement.

In dependency of the speed of the receiving belt or partitioned type belt, it is possible to use one, two or three synchronizing belts. Up to a speed of the receiving belt of approximately 0.5 m per second one synchronizing belt is to be provided, up to a speed of approximately 1.5 m per second two synchronizing belts are to be provided and above the speed of 1.5 m per second it is favorable to provide three synchronizing belts. When using two synchronizing belts, it is favorable when these are always driven at the same speed for each article so that the slip in the respective article during the transfer from the conveyor belt onto the following synchronizing belt is approximately as great as during the transfer from the second synchronizing belt onto the following conveyor belt. This means that the slip movements, which are not linear with the speed difference, can remain unconsidered, thus significantly simplifying the control of the entire system.

When using three synchronizing belts, it must be assured that the two synchronizing belts on the outside are each moved at the same speed. The center synchronizing belt can have a different speed. Thus, symmetrical relationships also exist in the three synchronizing belts, which relationships permit a neglecting of the slip movements.

Furthermore, it is favorable according to the invention when the control of the system relationships is constructed synchronously so that the respective belts can be stopped or again started in each position.

BRIEF DESCRIPTION OF THE DRAWINGS

The invention will be described hereinafter in connection with one exemplary embodiment and the drawing, in which.

DETAILED DESCRIPTION

Figure 1:
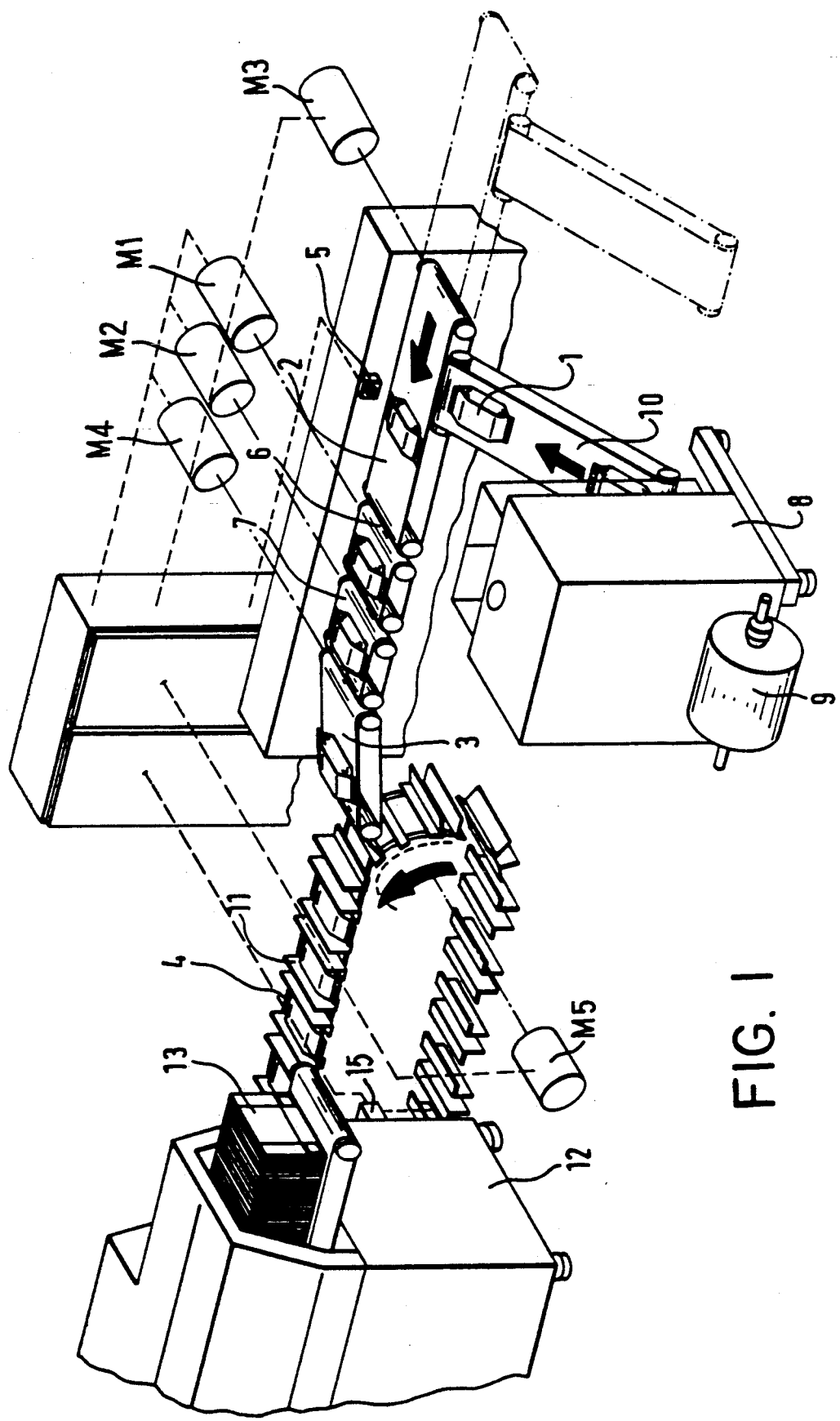
FIG. 1 is a partial perspective view of one exemplary embodiment of a system using the apparatus of the invention.

The system shown in FIG. 1 is a system for the manufacture, filling and also packaging of bags, which bags consist of a tubular bag welded or sealed at both ends. FIG. 1 therefore shows schematically a filling device in which the material for the bags or articles is supplied in the form of a path arranged on a roller 9. The supplying of the content to be filled into the bags or articles 1 is not shown for reasons of simplicity. A conveyor 10 follows the filling device, which conveyor has an upwardly inclined conveyor belt. The articles 1 are transferred from this conveyor 10 onto a horizontally running first conveyor belt 2. It is also possible, as this is illustrated by dash-dotted lines in the right half of FIG. 1, to provide further filling devices or similar ones and to design for example the first conveyor belt 2 longer.

A sensor device 5 is arranged in the area of the first conveyor belt 2, which sensor device can be designed, for example, in the form of a light barrier The center of gravity of the article 1 can be determined according to the invention by means of the sensor device 5. It is furthermore possible to determine the spaces between adjacent articles 1 and to adjust the spaces with respect to their phase relationship. The synchronizing or adjusting in the illustrated exemplary embodiment is done by using two successively arranged synchronizing belts 6, 7, which are driven by variable speed motors M1 and M2 independently from drive M3 of the first conveyor belt 2 and can speed up or delay the respective articles. The second synchronizing belt is followed by a second conveyor belt 3 which extends slightly downwardly inclined in the illustrated exemplary embodiment. The second conveyor belt 3 driven by a motor M4 ends in a receiving or partitioned belt 4 driven by a drive motor M5, which to simplify the illustration is also only schematically shown. The partitioned belt 4 has transversely extending walls 11 to form the partitions, which transversely extending walls 11 are positioned at a right angle with respect to the conveying direction.

A packaging device 12 is arranged following the receiving or partitioned type belt 4. Folded cardboard boxes 13 can, for example, be used in the packaging device 12, into which cardboard boxes the articles 1 can be moved. A sensor 15 is provided for detecting whether the space between partitions on the receiving belt are occupied by an article. A sensed article will effect, also in response to a sensed article by the sensor device 5, a control of the speed of the synchronizing belts 6 and 7 to prevent a double filing of the space between partitions on the receiving belt.

The invention provides that the first and the second conveyor belts 2, 3 are each driven by their drive motors M3 and M4 at the same conveying speed and together have a speed which is at least 1.3 times, preferably 1.6 times faster than the speed of the receiving belt 4 driven by the drive motor M5. This results in a separation of the individual articles 1, thus permitting an adapting and an adjustment of the position of the individual articles.

Figure 2:
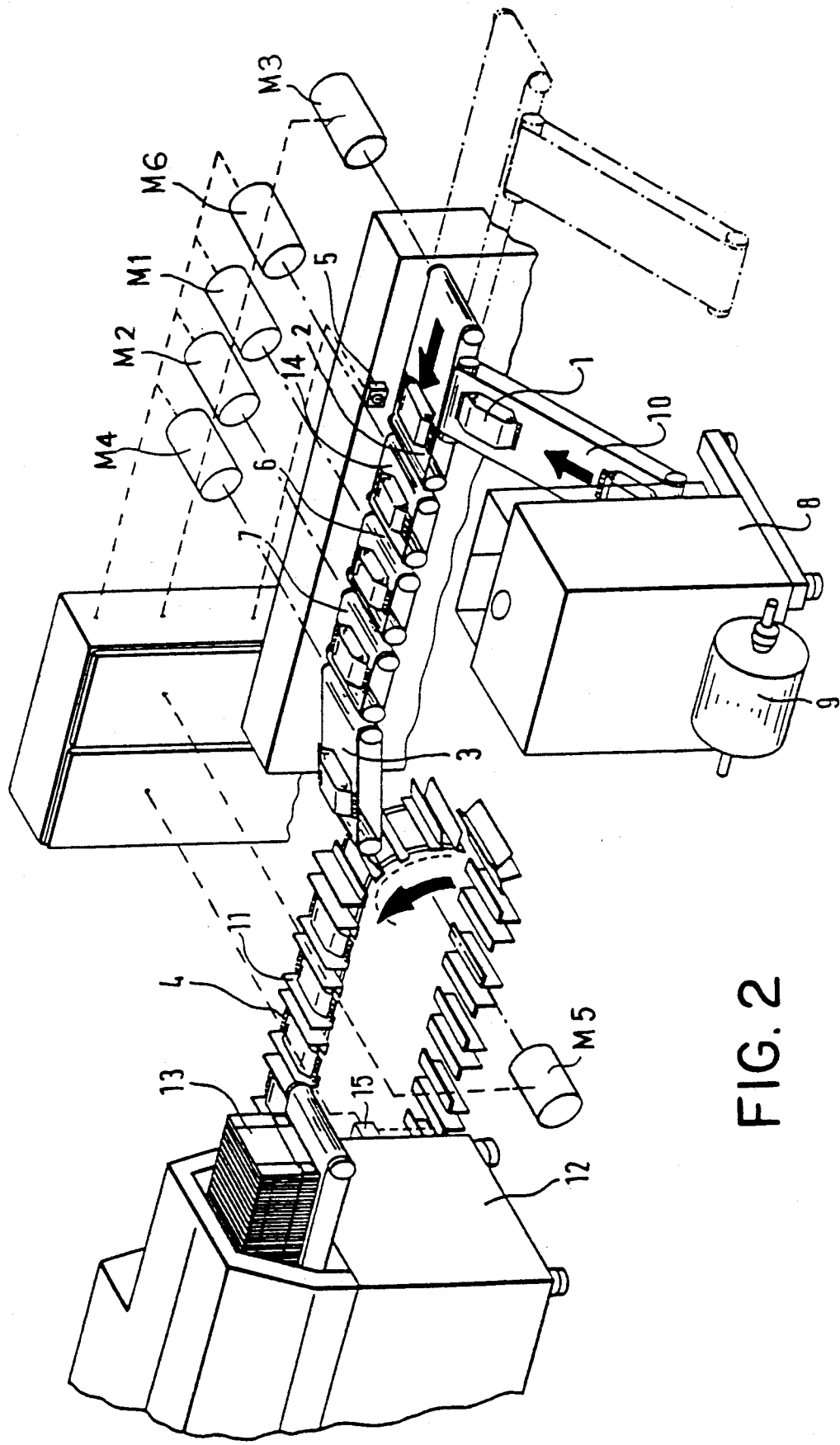
FIG. 2 is a partial perspective view of a further exemplary embodiment with three synchronizing belts.

The invention is not to be limited to the illustrated exemplary embodiment. Instead, many possibilities for modifications within the scope of the invention are conceivable to the man skilled in the art, such as the provision of a third synchronizing belt 14 as shown in FIG. 2 and a variable speed drive motor M6 therefor.

The embodiments of the invention in which an exclusive property or privilege is claimed are defined as follows:

1. A method for conveying and synchronizing the movement of articles, comprising the steps of:
   guiding articles onto a first conveyor belt;
   transferring the articles from said first conveyor belt to a synchronizing belt;
   transferring the articles from said synchronizing belt to a second conveyor belt; and
   thereafter transferring the articles from said second conveyor belt onto a receiving belt;
   driving said receiving belt at selected speed; and
   driving the first and second conveyor belts at the same speed, which speed is faster than said selected speed of said receiving belt whereby the articles are transferred onto said receiving belt without the necessity of first orienting the articles so that no gap exists therebetween.

2. The method according to claim 1, wherein said synchronizing belt is selectively accelerated or delayed for controlling the relative position between the articles at the moment in time they are transferred onto said receiving belt.

3. The method according to claim 1, wherein said speed of said first and said second conveyor belts is at least 1.3 times the speed of the receiving belt.

4. The method according to claim 1, including the step of determining, in a region of said first conveyor belt, a center of gravity of the respective article and a phase deviation from a desired position referred to the receiving belt, and the step of controlling the speed of movement of said synchronizing belt so that same will have reached a desired speed when the center of gravity of the article also reaches and is transferred onto said synchronizing belt.

5. The method according to claim 1, wherein said speed of said first and the second conveyor belt is at 1.6 times the speed of the receiving belt.

6. The method according to claim 4, a partitioned type belt is used as the receiving belt, and the article is transferred onto an upwardly opening portion of said partitioned type belt.

7. The method according to claim 6, wherein prior to insertion of an article into a space on the partitioned type belt, it is examined whether the space is free, said speed of said synchronizing belts being controlled in response to said space being occupied or free and also in response to said center of gravity to thereby prevent a double filling of an occupied space.

8. An apparatus for conveying and synchronizing the movement of articles, comprising:
   a first conveyor belt and first means supporting said first conveyor belt for movement;
   a second conveyor belt and second means supporting said second conveyor belt for movement;
   a receiving belt and third means supporting said receiving belt for movement, said receiving belt being oriented immediately adjacent and downstream of said second conveyor belt;
   a synchronizing belt and fourth means supporting said synchronizing belt for movement, said synchronizing belt being oriented between and directly adjacent said first and second conveyor belts;
   first drive means for driving said first and second conveyor belts at a selected identical speed;
   second drive means for driving said receiving belt at a speed slower than said selected speed; and
   third drive means for driving said synchronizing belt for movement at selectively variable speeds;
   whereby the articles are transferred onto said receiving belt without the necessity of first orienting the articles so that no gap exists therebetween.

9. The apparatus according to claim 8, wherein said speed of said first and second conveyor belts is at least 1.3 times the speed of said receiving belt.

10. The apparatus according to claim 8, wherein the maximum speed of said conveyor belts is 3 m per second.

11. The apparatus according to claim 8, wherein the position of the article on said first conveyor belt is determined by means of a sensor.

12. The apparatus according to claim 8, wherein said third drive means drives said synchronizing belt at a speed of said receiving belt up to generally 0.5 m per second.

13. The apparatus according to claim 8, wherein a further synchronizing belt is provided in series immediately adjacent said first mentioned synchronizing belt and is driven at a speed of said receiving belt up to generally 1.5 m per second.

14. The apparatus according to claim 8, wherein two further synchronizing belts are provided in series immediately adjacent said first mentioned synchronizing belt and are driven at a speed of said receiving belt up to over 1.5 m per second.

15. The apparatus according to claim 14, wherein, in conveying direction, the first and the last synchronizing belt are moved at the same speed.

16. The apparatus according to claim 8, wherein said receiving belt is designed as a partitioned type belt.

17. The apparatus according to claim 8, wherein said speed of said first and second conveyor belts is at least 1.6 times the speed of said receiving belt.

* * * * *

UNITED STATES PATENT AND TRADEMARK OFFICE
CERTIFICATE OF CORRECTION

PATENT NO. : 5 092 450

DATED : March 3, 1992

INVENTOR(S) : Eugen SCHOMMARTZ et al.

It is certified that error appears in the above-identified patent and that said Letters Patent is hereby corrected as shown below:

On the title page, item [73], the Assignee should read:
---Rovema Verpackungsmaschinen GmbH---.

Col. 5, line 45; after "belt at" insert ---a---.

Signed and Sealed this

Twenty-first Day of September, 1993

Attest:

BRUCE LEHMAN

Attesting Officer  Commissioner of Patents and Trademarks